Jan. 31, 1961 D. H. GRIDLEY 2,970,302

DIGITAL SYNCHRO DATA TRANSMISSION SYSTEM

Filed Dec. 8, 1950 9 Sheets-Sheet 1

INVENTOR
DARRIN H. GRIDLEY

BY D. C. Snyder
Howard White
ATTORNEYS

INVENTOR
DARRIN H. GRIDLEY

BY D. C. Snyder
Howard White
ATTORNEYS

Jan. 31, 1961 D. H. GRIDLEY 2,970,302

DIGITAL SYNCHRO DATA TRANSMISSION SYSTEM

Filed Dec. 8, 1950

9 Sheets-Sheet 3

INVENTOR

DARRIN H. GRIDLEY

BY

D. E. Snyder

Howard White

ATTORNEYS

INVENTOR
DARRIN H. GRIDLEY

BY [signature]
ATTORNEYS

INVENTOR
DARRIN H. GRIDLEY

BY
D. E. Snyder
Howard White
ATTORNEYS

INVENTOR
DARRIN H. GRIDLEY

BY

ATTORNEYS

Jan. 31, 1961 D. H. GRIDLEY 2,970,302

DIGITAL SYNCHRO DATA TRANSMISSION SYSTEM

Filed Dec. 8, 1950 9 Sheets-Sheet 7

INVENTOR
DARRIN H. GRIDLEY

BY D. C. Snyder
Howard White
ATTORNEYS

Jan. 31, 1961 D. H. GRIDLEY 2,970,302

DIGITAL SYNCHRO DATA TRANSMISSION SYSTEM

Filed Dec. 8, 1950 9 Sheets-Sheet 8

INVENTOR
DARRIN H. GRIDLEY

BY D. C. Snyder
Howard White
ATTORNEYS

INVENTOR
DARRIN H. GRIDLEY

BY D. C. Snyder
Howard White
ATTORNEYS

United States Patent Office 2,970,302
Patented Jan. 31, 1961

2,970,302

DIGITAL SYNCHRO DATA TRANSMISSION SYSTEM

Darrin H. Gridley, % Naval Research Laboratory, Anacostia Station, Washington, D.C.

Filed Dec. 8, 1950, Ser. No. 199,907
14 Claims. (Cl. 340—206)
(Granted under Title 35, U.S. Code (1952), sec. 266)

This invention relates in general to telemetering systems.

More specifically this invention relates to a method and apparatus for providing a telemetering system operating through a follow-up system where the communication link between the source of information and the information indicating means may be a radio, Teletype, telephone channel, or a similar narrow band communication link.

Prior art follow-up devices such as the selsyn or synchro systems require at least three conductive paths connecting the transmitter and receiver devices between which a sinusoidal voltage is coupled. Such systems become impractical when the director and follower devices are separated by large distances. As is apparent to those skilled in the art, existing radio, power line, or Teletype communication links cannot be readily used as a transmission channel for the sinusoidal voltages coupled between these prior art selsyn transmitter and receiver devices.

The great advantage of being able to duplicate the motion of a given object such as a rotatable shaft at a remote distance with extreme accuracy connected only by a radio or Teletype channel is obvious.

Accordingly one object of the present invention is to provide a relatively simple follow-up system where no more than two conductive paths are required (i.e., a two wire transmission line or its equivalent) between the director and follower devices.

Another object of the present invention is to provide a relatively simple and accurate follow-up system which may use conventional Teletype, or radio pulse communication channels and the like between the director and follower devices and where accurate phase or frequency relationships are not necessary between the voltages at the sending and receiving end.

Still another object of the present invention is to provide a relatively simple and accurate apparatus for positioning a remotely located object in any number of positions to represent the value of a given variable measured at a given location.

These and other objects of the present invention will become apparent from the specification to follow and the drawings wherein.

Figure 2:
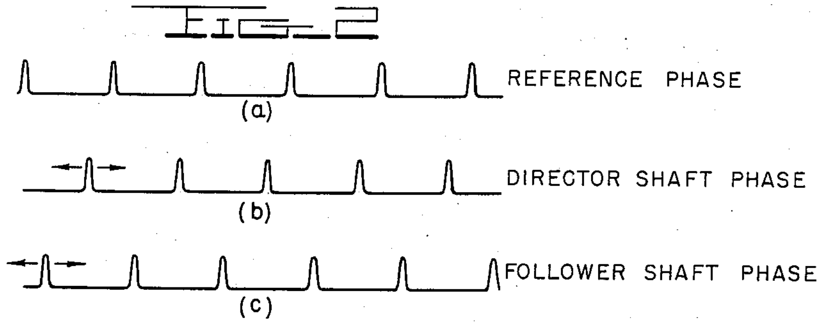
Figure 2 shows various voltage pulse waveforms associated with the embodiment of Figure 1.
Figure 4:
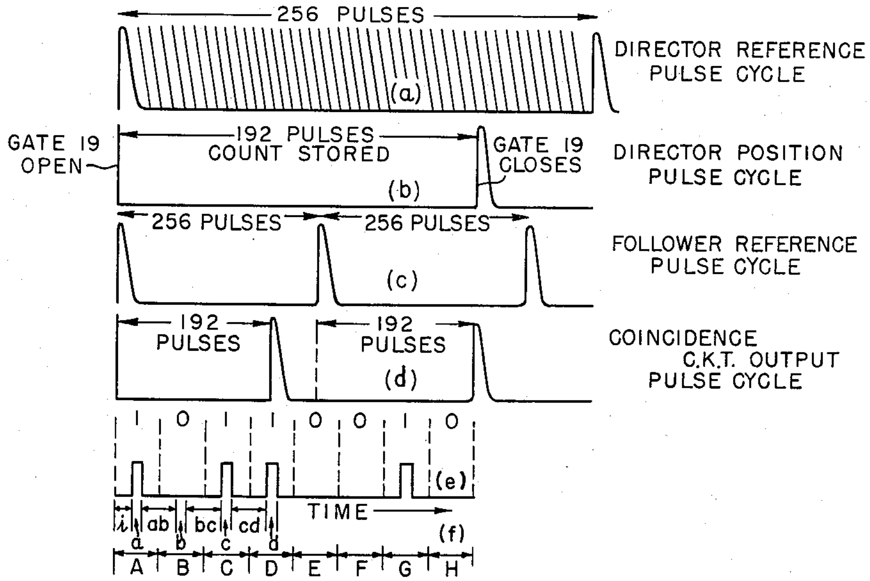
Figure 4 shows various voltage waveforms associated with the embodiment of Figure 3.
Figures 6, 7:
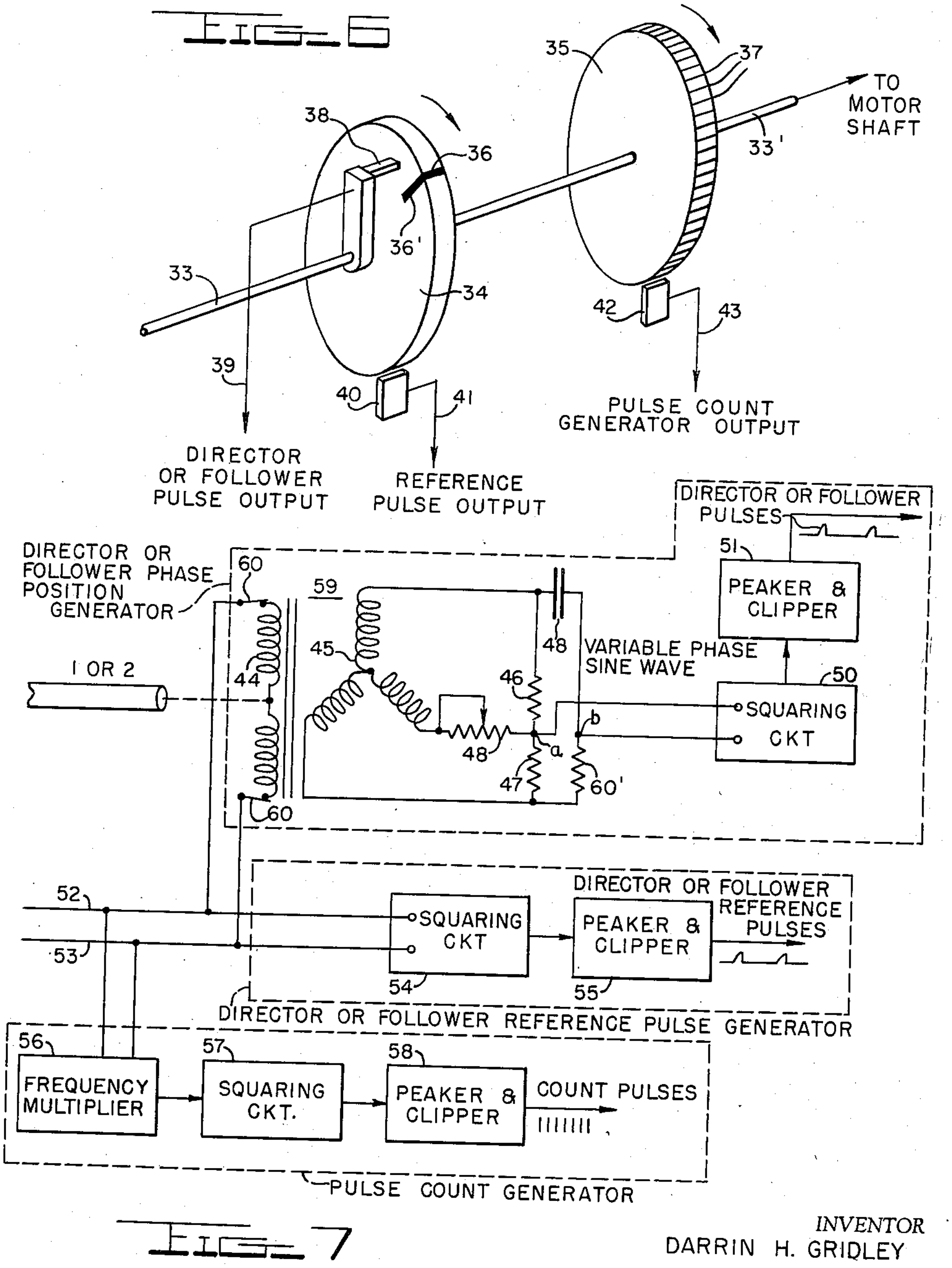

Figure 6 discloses one means for producing the various pulses shown in Figures 2 and 4.

Figure 7 shows another means for producing the pulses shown in Figures 2 and 4.

Figure 3:
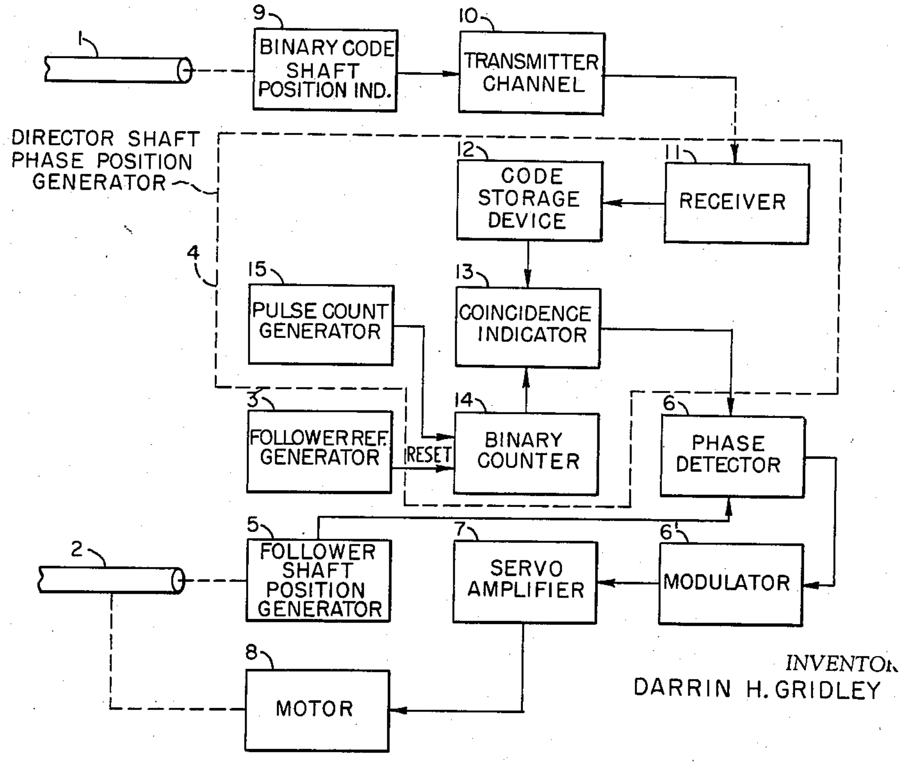
Figure 3 is a block diagram showing the basic elements of the present invention which is an improvement of the embodiment of Figure 1.
Figure 8:
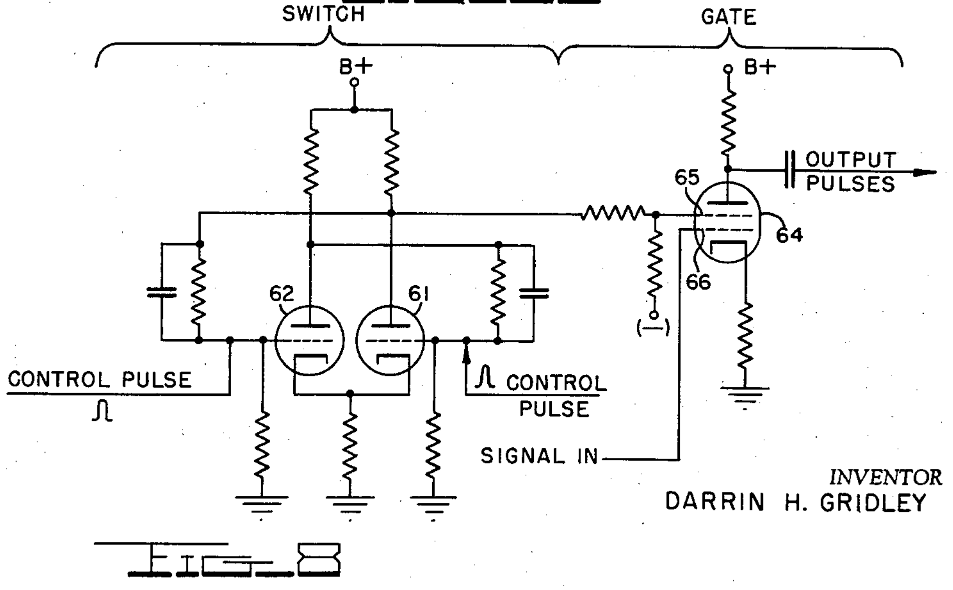

Figure 8 is a circuit diagram of the various switch and gate circuit combinations used in the embodiments of Figure 3.

Figure 9:
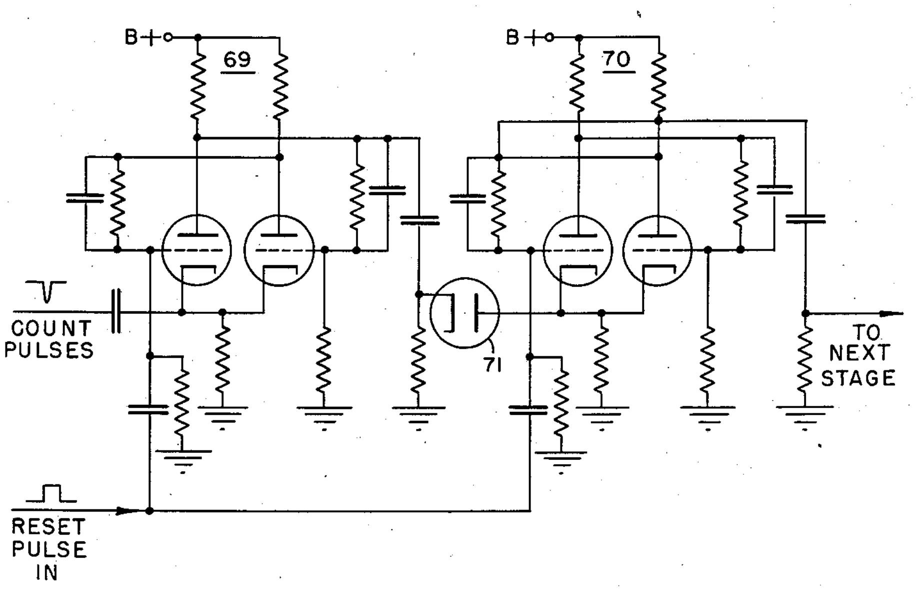

Figure 9 is a simplified circuit diagram of the counter circuit used with the embodiment of Figure 3.

Figure 10:
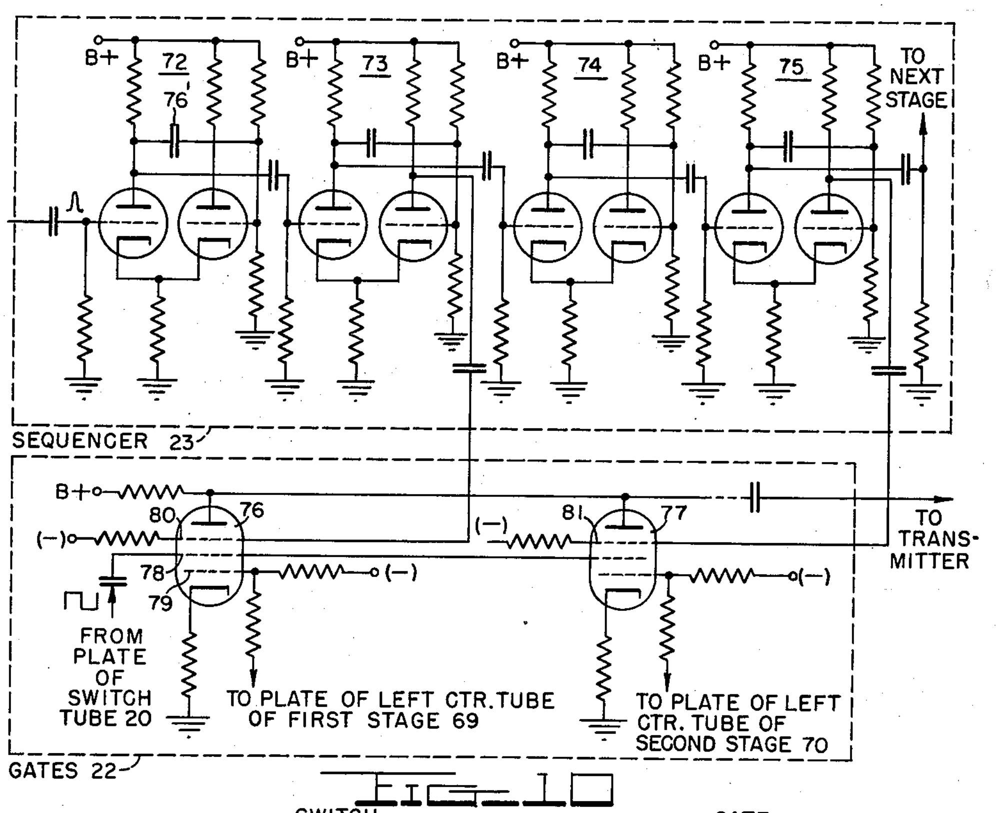

Figure 10 is a simplified circuit diagram of the sequencer and gate circuit used in the transmitter channel of the embodiment of Figure 3.

Figure 11:
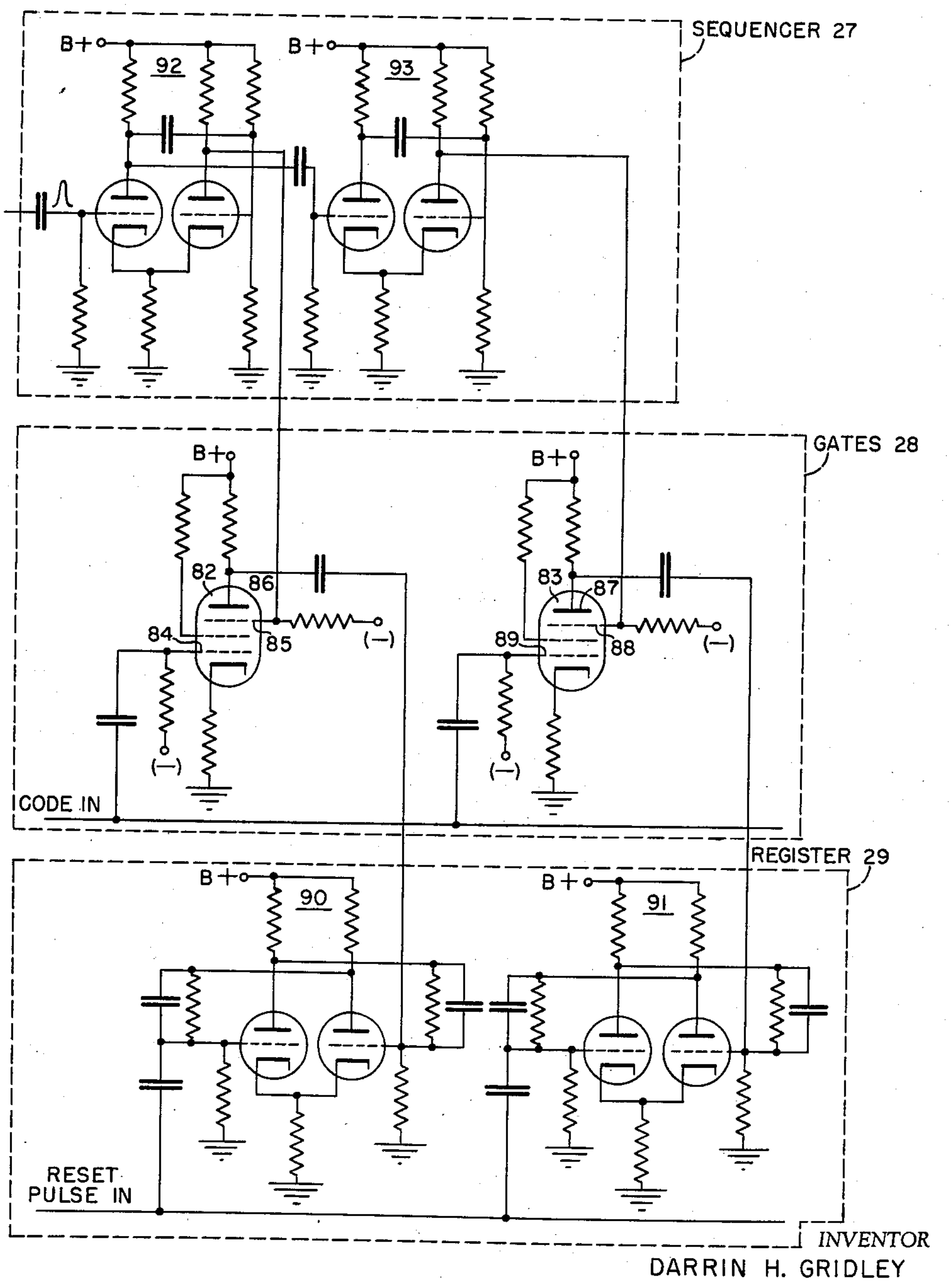

Figure 11 is a circuit diagram of the gate and register circuit used at the receiving end of the embodiment of Figure 3.

Figure 12:
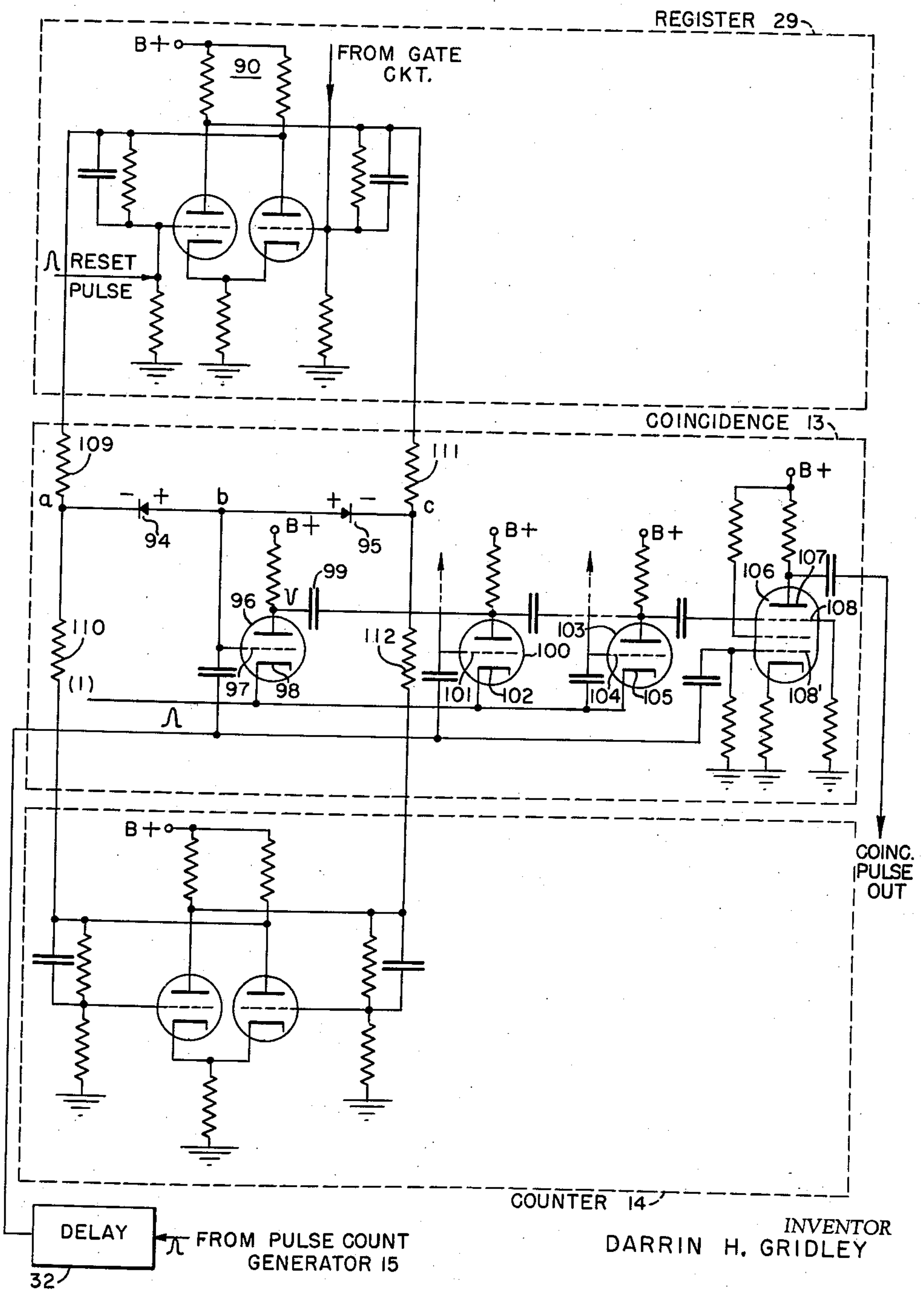

Figure 12 is a circuit diagram of the coincidence circuit used with the embodiment of Figure 3.

Figure 1:
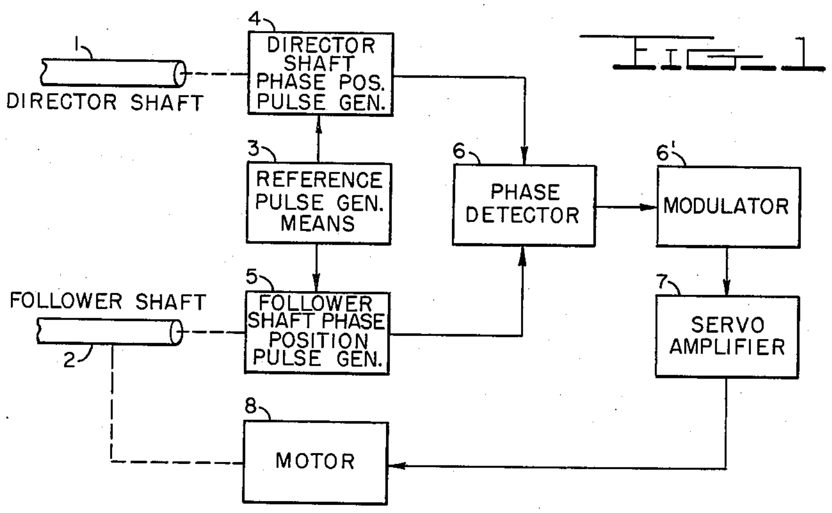
Figure 1 is a block diagram of the elements forming the basic system on which the present invention is an improvement.
Figure 13:
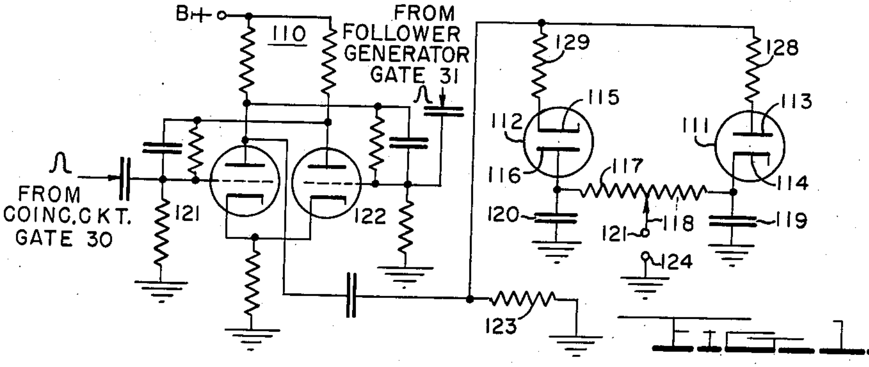

Figure 13 is a circuit diagram of the pulse phase detecting circuit used with the embodiment of Figures 1 and 3.

Figure 14:
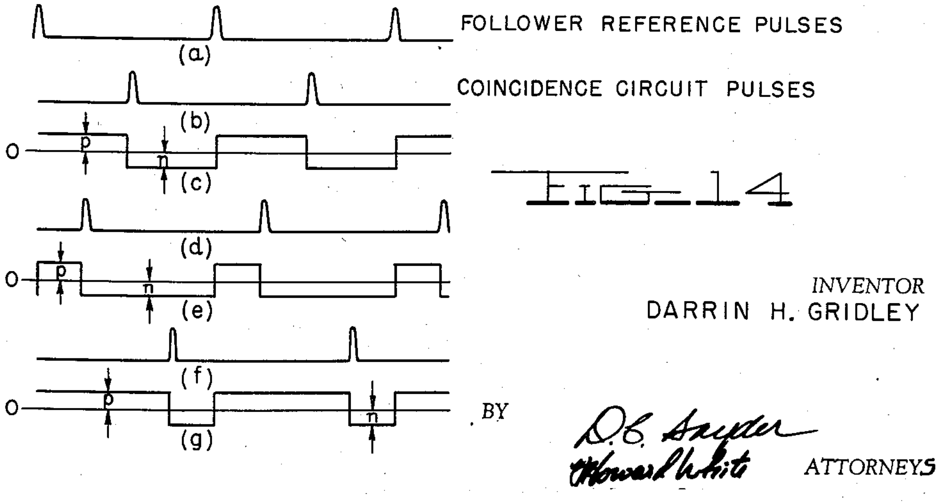

Figure 14 shows various voltage waveforms of the phase detector circuit.

Figure 5:
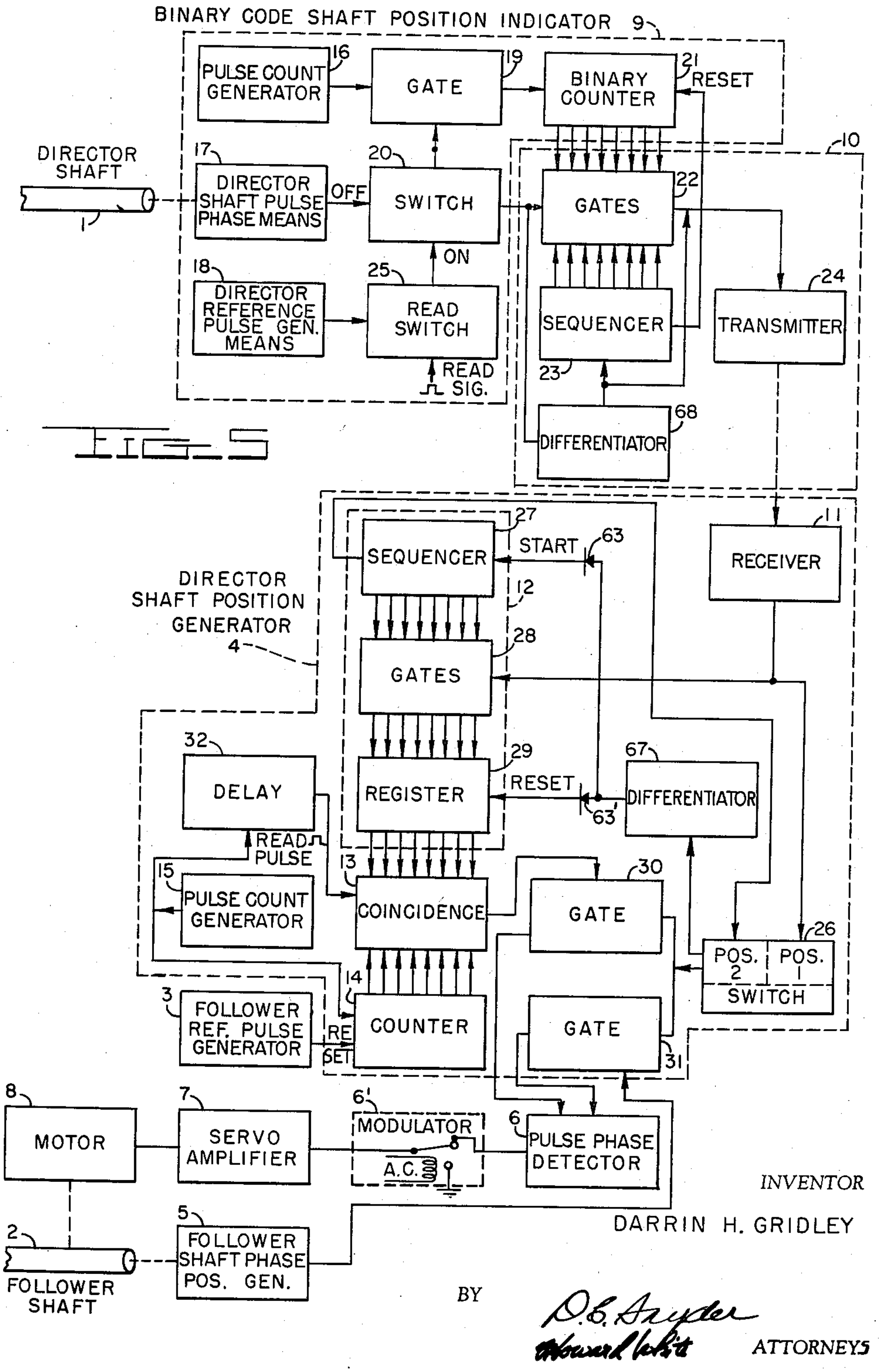
Figure 5 is a more detailed block diagram of the embodiment of Figure 3.
Figures 15A, 15B:
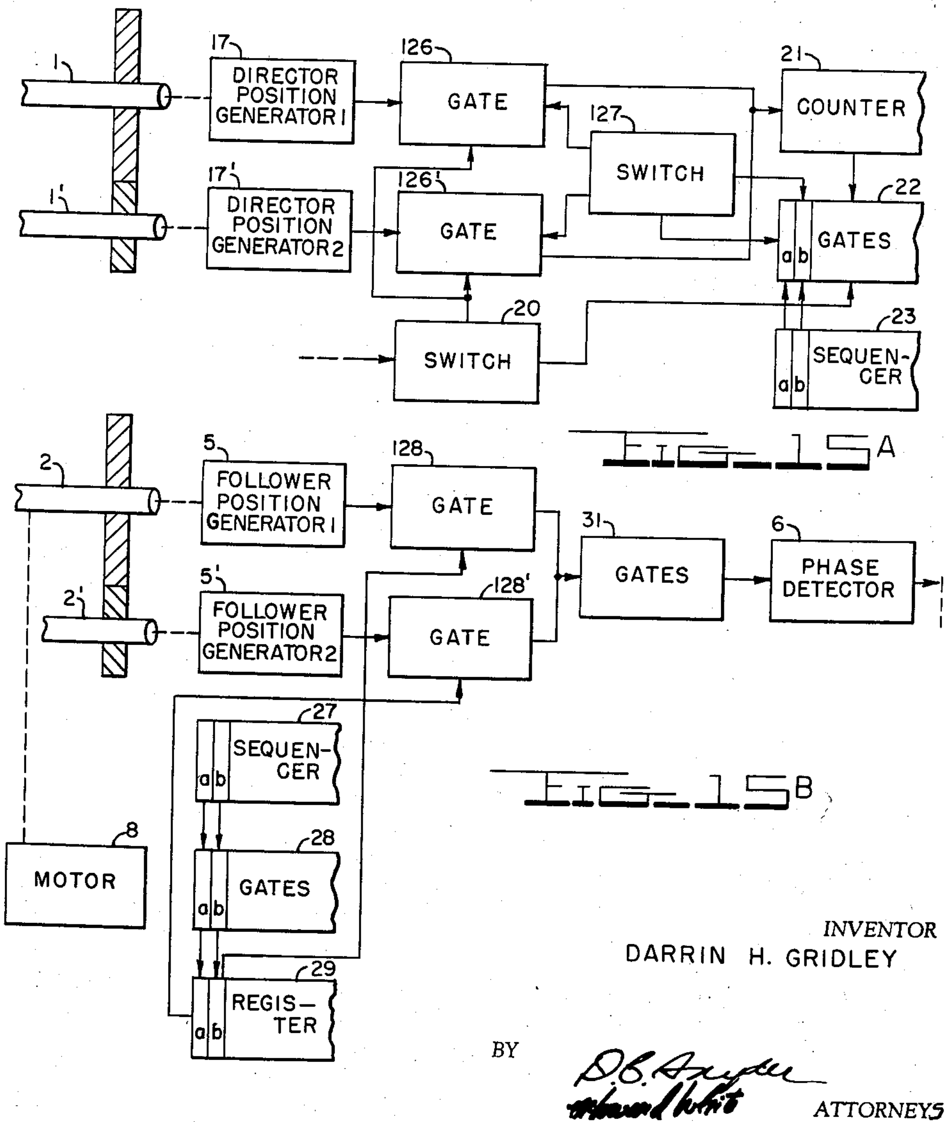

Figures 15*a* and 15*b* are modifications of the embodiment of Figure 5.

One novel aspect of the present invention is in generating pulses having a phase (time position) proportional to the value of a given variable at the sending end such as the position of a director shaft in a follow-up system, comparing the phase of these pulses with that of pulses generated at the receiving location whose phase is proportional to the position of a given moveable object such as a follower shaft, and then providing a control voltage proportional to the phase (time position) difference of these pulses which is used to energize a motor which in turn moves the said given moveable object to a position corresponding to the phase of the pulses representing the value of the given variable at the sending end.

Another aspect of the present invention, which is an improvement over the broader concept described in the previous paragraph, is in using a coded group of pulses (preferably binary code) to represent the value of the variable at the sending end, and then storing the coded group of pulses at the receiving end. The coded group of pulses thus stored are then converted into a continuous group having a phase and pulse repetition rate dependent on the code stored, and are then compared with the phase of pulses having the same pulse repetition rate which represents the position of a given moveable member at the receiving end such as a rotatable shaft. A control voltage is then produced which is proportional in magnitude to the difference in phase of the aforementioned pulses, which in turn is used to energize a motor which moves the said moveable member until the phase of the pulses which represent the position of that member is such that the said control voltage becomes zero.

For purposes of the explanation to follow, the term "binary code" refers to a code wherein each code character may have only two possible characteristics such as mark or space, etc.

Referring now to the drawings where the same reference numerals represent substantially identical elements, the means for carrying out the broadest aspect of the present invention is shown in block form for a follow-up system in Figure 1. In this embodiment a suitable pulse generating means 4, hereinafter described in detail, is coupled to director shaft 1 and generates voltage pulses having a phase proportional to the position of the director shaft 1. The phase of these pulses is measured in relation to that of a reference phase pulse generator means 3.

A second pulse generating means 5 similar in design to generator 4 is coupled to the follower shaft 2 and generates voltage pulses having the same pulse repetition rate as that generated by reference phase means 3 and director shaft generator means 4 but whose phase relative to generator 3 is proportional to the position of follower shaft 2.

The pulses from director and follower voltage generating means 4 and 5 are fed to a suitable phase detector 6, also described in detail hereinafter, which produces a control voltage whose magnitude is proportional to the phase difference between these groups of pulses fed thereto. This voltage is fed to a motor 8 through a suitable modulator 6' and an amplifier such as a well known type of servo amplifier 7. As long as there is a certain phase difference between the two aforementioned pulses which are fed to phase detector 6, motor 8 will turn follower shaft 2 until it is in the same relative position as director shaft 1.

Figure 2, waveform *a*, shows the voltage pulse waveform produced by the reference phase generator means 3. This voltage remains substantially stationary in phase.

Waveforms *b* and *c* of Figure 2 show respectively the variable phase voltages produced respectively by director and follower generating means 4 and 5.

The director shaft position generator 4 and the follower shaft position generator 5 which are mechanically coupled to the said respective shafts would in all probabilities be located respectively in the vicinity of the director and follower shafts 1 and 2. Motor 8, which is mechanically coupled to follower shaft 2, would be located in the vicinity of follower shaft 2 while phase detector 6, modulator 6', reference generator 3, and servo amplifier 7 could be located at any desired location. It will be assumed that all of the latter components will be located at the follower shaft location.

If the director and follower shafts 1 and 2 were located a large distance apart, for example 25 miles or more, it is apparent that at least two transmission channels would be needed to transfer the reference pulses of reference generator 3 from the follower shaft location to the director shaft location, and the variable phase output of the director position generator 4 to the follower shaft location.

The pulse repetition rate of the pulses from the director and follower position generators 4—5 must of necessity be identical. The latter condition although not impossible of attainment, is a difficult and burdensome requirement.

The relative phase of the pulses fed to the phase detector from the director and follower position generators would be a function of the distance between the director and follower shaft locations which would make the system a very unsatisfactory one. If the director shaft were located in a moving object such as an airplane, the system could not possibly operate since the relative phase of the pulses fed to the phase detector would be continually changing even though the director and follower shafts were stationary.

Figure 3 is an improvement over the rather broad and basic system shown in Figure 1 in that it requires only a single communication channel where no accurate phase or frequency relationships between the signals received and the pulses generated at the receiver location are needed. The system here shown has special application to follow-up systems and the like where the position of a director is to be transmitted through a two wire transmission system or its equivalent such as a radio communication link. For such application it is desirable to efficiently and simply transmit information of the position of shaft 1 to a remote location where a movable member 2 is to be positioned to be in accord with or to indicate the value of the position of shaft 1. (The present invention also has application where variables other than the position of a shaft is to be metered to a remote location.)

In this embodiment a suitable binary code pulse generator later described in detail gives an indication of the position of shaft 1 in the form of a coded group of pulses. If a binary code is used, the circuits required at the receiving end are greatly simplified. Such a binary code shaft position generator is disclosed in my copending application Ser. No. 96,801, filed June 2, 1949, entitled "Position Indication Devices" now U.S. Patent No. 2,680,241.

This coded group of pulses is transmitted over a communication link by means of transmitter channel 10 which may include, for example, a radio transmitter apparatus in conjunction with other elements which will be later described. The transmitter may be of any suitable type such as one utilizing amplitude modulation. In such case the pulses at the input to the transmitter would modulate a carrier wave in the conventional manner.

The coded pulses are received at a receiver 11, which may be a radio receiver or the like, and are then stored in a code storage device 12 where the coded group of pulses are thereafter converted into pulses of a given pulse repetition rate whose phase is dependent on the particular coded pulses received.

The elements for producing these variable phase pulses include a circuit for providing a continually changing binary coded group of pulses which represent the gradually changing coded group of pulses produced by the code shaft position indicator 9 if director shaft 1 were gradually moved from position to position. The range of the possible variation of the coded pulses is periodically scanned in synchronism with pulses produced by a reference voltage generator 3 in the receiver equipment. For the case where a binary code is used, this is accomplished by means of a conventional binary counter 14 which is reset periodically by the pulses produced from reference generator 3, and a suitable pulse count generator 15 which generates as many pulses in one period of the pulse cycle of reference generator 3 as there are different coded groups.

Pulse count generator 15 could be a multivibrator oscillator or the like. For example, if we desire to duplicate 256 different positions of director shaft 1, then 256 different coded pulse groups may be provided by code shaft position indicator 9. If a straight binary code is used, then counter 14 will be a conventional 8 stage binary counter ($2^8=256$). Pulse count generator 15 will have a pulse repetition rate 256 times that of reference generator 3, or the follower position generator 5. Of course, if desired, other binary codes may be used.

It is to be noted that the greater the number of different coded pulse groups used to represent one revolution of director shaft 1, the more accurate the system will be.

A coincidence circuit 13, later described in detail, is provided which will produce a pulse whenever the code registered in code storage device 12 is identical with that of the counter 14. Since, as previously mentioned, the scanning rate of counter 14 is equal to the pulse repetition rate of follower shaft position generator 5, the pulses at the output of coincidence circuit 13 will be equal to the pulse repetition rate of follower position generator 5 and will vary in phase as the transmitted coded group of pulses is changed.

Follower shaft generator 5 has a pulse repetition rate equal to that of the reference generator 3 and variable in phase with the position of follower shaft 2. The output of coincidence indicator 13 and that of follower shaft generator 5 are fed to a phase detector 6 which produces a voltage whose magnitude is proportional to the phase difference of the voltages fed thereto. As in the embodiment of Figure 1, this voltage is used to energize motor 8 which in turn moves follower shaft 2 to accord with that of the director shaft 1.

Assuming at any given moment that the director and follower shafts 1 and 2 are in the same relative position and that the complete rotation of shaft 1 would cause code indicator 9 to generate 256 different coded pulse groups, changing the position of shaft 1 360/256 degrees will change the code transmitted by transmitter 10. A pulse will then be produced by coincidence indicator 13 one pulse count later which will cause the pulses fed to phase detector 6 to change in phase which in turn will cause shaft 2 to be moved in coincidence with director shaft 1.

It should be noted that the novel arrangement of circuits just described has provided pulses at the output of coincidence circuit 13 which have the same pulse repetition rate as those of the follower reference generator 3 and whose phase relative to the follower reference generator 3 indicates the position of the director shaft 1. This has been accomplished by transmitting only a coded group of pulses between the director and follower shaft locations.

Although the present invention has been described with respect to a shaft position follow-up system, it could be used where any variable is to be indicated by the position of a shaft such as shaft 2. For example, assume that code indicator 9 would be constructed to directly respond to temperature changes having 256 possible different values by providing 256 respective binary code combinations. It is clear that this system would operate to indicate temperature if an index pointer would be attached to shaft 2 and a calibrated scale were mounted adjacent the said pointer.

Of course, if director shaft 1 were coupled to a temperature indicating device so that its position changed with temperature, the system there disclosed would be operative as a telemetering system operating through a follow-up system of moveable shafts.

To more clearly describe one exemplary embodiment for carrying out the embodiment of Figure 3 reference should be made to Figure 5 which is a more detailed breakdown of the block diagram of Figure 3.

The binary code shaft position indicator 9 comprises a pulse count generator 16 which feeds pulses to a binary code counter 21 through a gate circuit 19. Pulse count generator 16 and binary counter 21 are similar to pulse count generator 15 and counter 14 previously mentioned in connection with Figure 3. Gate circuit 19 is operative to couple the pulses fed thereto only when switch means 20 is in the "on" position. Switch 20 is turned to the "on" position when a pulse is fed from a director reference pulse generator 18 which occurs when a switch 25 is closed. Director reference pulse generator 18 is similar to reference pulse generator 3 previously mentioned in the description of Figure 3. That is, it produces a set of fixed phase reference pulses shown by the broad sharp pulses of waveform *a* in Figure 4. A director position phasing means 17 is provided which is similar to follower shaft position generator 5 previously mentioned. It produces pulses at the same repetition rate as the pulses of the director reference pulse generator 18 but varying in phase relative thereto according to the rotational position of director shaft 1.

Switch 20 is turned off by the pulses fed thereto from the director shaft phase means 17.

It should now be apparent that the number of pulses fed to binary counter 21 through gate 19 is proportional to the amount of time that switch 20 is in the "on" position. Switch 20 is on for a time proportional to the phase difference of the pulses produced by the reference and shaft position generators 18 and 17 so that the binary code produced by counter 21 is an indication of the position of shaft 1.

If it is desired to have 256 straight binary pulse code groups represent a complete rotation of shaft 1, then the following conditions would be present: The frequency of pulse count generator 16 would be 256 times the pulse repetition rate of the reference and shaft position generators 18 and 17; one rotation of director shaft 1 must displace the phase of the pulses from director position generator 17 360 degrees relative to the frequency or pulse repetition rate of the director reference generator 18 and the counter 21 is made to reset to zero code position every 256 counts.

Referring to the voltage waveforms in Figure 4, the broad sharp pulses there shown in waveform *a* are those of the reference pulse generator 18. If during one cycle of this generator 256 pulses occur in pulse count generator 16 as shown by the narrow pulses of waveform *a* and shaft 1 is displaced so that it is 270 degrees from the position in which the pulses from director reference and position pulse generators 17 and 18 are in phase, then gate 19 will be open long enough to count 192

$$\left(\frac{270}{360}\times 256\right)$$

pulses as shown in waveform *b*.

When switch 20 is turned off by the pulse from the director generator 17, functions are performed by switch 20 other than that of closing gate 19. Switch 20 opens another gate 22 (gate 22 consists of a plurality of gates, one for each stage of binary counter 21), it starts sequencer 23 into operation, and also sends a control pulse to transmitter 24 if a radio communications link is used. Of course, the above mentioned control pulse could be generated by any suitable means. Where a Teletype channel is utilized, the control pulse is sent at different carrier frequency than the signal pulses as is common in Teletype systems.

The circuit details of the gate and sequence circuits 22 and 23 will be later explained but broadly their function is to produce a sequence of pulses which reproduces the binary code indicated by counter 21. Sequencer 23 successively opens gate 22. If the particular counter stage associated with the gate which is open is in the mark position a pulse will be fed to transmitter 24. If a particular stage of the counter 21 is in the space position no pulse will be fed to transmitter 24.

If the binary code is 10110010, then the pulse sequence would be that shown in waveform *e* of Figure 4 (mark-space-mark-mark-space-space-mark-space). These pulses, preceded by the initiating pulse from switch 20, are fed to transmitter 24.

Before the receiving end of the system is described, it is important to note that one of the most important aspects of the present invention is that the follower shaft 2 may be positioned with extreme accuracy without requiring voltages at the transmitter and receiving end to be accurately related as to phase or frequency. This has been accomplished by utilizing the difference in phase between the pulse outputs of the director reference generator 18 and the director shaft position pulse phasing means 17 to control the number of pulses fed to binary counter 21 from a pulse source 16 having a substantially higher pulse rate than that of the latter pulses. (See waveforms *a* and *b* of Figure 4.) Then the binary code indicating the number of pulses is transmitted to the follower location in a pulse sequence representing the binary code as shown in waveform *e* of Figure 4. The coded group of pulses are then stored and converted into pulses having any desired repetition rate as shown by the broad sharp pulses in waveform *d* of Figure 4. These pulses are made to have the same phase relative to a second set of reference pulses of the same reptition rate generated at the follower location (see broad sharp pulses of waveform *c* of Figure 4) as the phase of the output pulses of the director shaft position phasing means 17 (waveform *b*) relative to the output of the director reference generator 18.

The pulses at the output of the receiver 11 comprise an initiating control pulse which was generated when switch 20 was turned off followed by the coded group of pulses. The initiating pulse actuates a dual stability switch means 26 into a first position which closes gates 30 and 31 for reasons which will later be explained. Actuation of switch 26 into the first position also produces a pulse which is fed to sequencer 27 which in conjunction with gate 28 stores the coded pulse groups in register 29. Sequencer 27 operates like sequencer 23 by successively opening a group of gates associated with each stage of register 29. If when any particular gate is opened a mark pulse is present, the mark pulse will be stored in a respective stage of register 29. If no pulse occurs when one of the gates 22 is open then no indication is stored in register 29.

The only circuits at the sending and receiving end which must operate at approximately the same repetition rate are the sequencers 23 and 27. That is to say, the rate at which sequencer 23 successively opens the gate circuits associated with each stage of counter 21 must be approximately equal to the rate at which sequencing circuit 27 opens the various gates of gate circuit 28 associated with the various stages of register 29. This will be more apparent when the circuit details of the sequencer and gate circuits are later explained in detail.

At the end of the sequencing period a pulse is fed to switch 26 to set it into switch position two or its original position whereupon gates 30 and 31 are opened. When gates 30 and 21 are open the pulses at the output of the coincidence circuit 13 and the follower shaft position generator 5 are coupled to phase detector 6. Gates 30 and 31 are opened only after the sequencing operation is completed thereby substantially preventing any false coincidence pulses during the period when the code is being stored in register 29.

As previously explained in connection with the discussion of Figure 3, the code stored in storage circuit 12 (more specifically the code stored in register 29) is compared with the changing binary code indication of counter 14 in a coincidence circuit 13. Due to the fact that most counters have an inherent delay between the time it receives a pulse and the time the pulse is registered or counted, the coincidence between the code in the register 29 and that of the free running counter 14 is tested or read a short time after each pulse is fed to counter 14 from pulse count generator 15. Thus delay circuit 32 is coupled between pulse count generator 15 and coincidence circuit 13 to delay the read pulses obtained from pulse count generator 15 a small fraction of the period between the pulses of pulse count generator 15. This period is so short as not to substantially affect the accuracy of the system. Delay circuit 32 may be any suitable pulse delay circuit well known in the art.

The output of the phase detector 6, as previously mentioned, produces a direct current voltage whose magnitude is proportional to the sense and magnitude of the phase difference of the pulses fed thereto.

This direct current voltage is converted into a voltage of suitable frequency for alternating current motor 8. This may be accomplished by means of a vibrator 6′ whose movable contact vibrates for example at 60 cycles per second between a contact connected to the output lead of the phase detector and ground so that, for example, a direct current voltage of positive 10 volts is converted into a voltage oscillating between plus 10 volts and zero or ground potential at a 60 cycle rate. The servo amplifier 7 converts this square wave of voltage into a higher magnitude sine wave of voltage which is used to feed one field of a two phase A.C. motor 8. Of course, if the output voltage from the phase detector 6 was a negative 10 volts, then the square wave output of vibrator 6′ would be oscillating between minus 10 volts and zero which would produce a voltage 180 degrees out of phase with the previous mentioned positive going square wave. This would cause the motor 8 to rotate in the opposite direction.

The explanation to follow is directed to the explanation and disclosure of the circuit or mechanical details of the circuits indicated by the boxes of Figures 1, 3 and 5.

Figure 6 discloses one means for producing the shaft position, reference, and count pulses. This means is disclosed in my copending application Ser. No. 96,801 filed June 2, 1949, entitled "Position Indicator Device," now U.S. Patent No. 2,680,241.

The pulses are there produced by movable discs 34 and 35 each of which carries with it areas of magnetic material 36 and 37 respectively.

The reference pulses are generated in a stationary magnetic pickup head 40 which may be of any well known type. The magnetic area 36 which causes the pulse output in pickup head 40 is located on the outer periphery of wheel 34 and passes in proximity to head 40.

The pulses which represent the position of director or follower shaft 1 or 2 are generated in a magnetic pickup head 38 which is mechanically coupled and movable with rotatable shaft 33 which in turn is coupled to the director or follower shafts. Pickup head 38 is located adjacent the side of disc 34 so that the magnetic area 36′ located on the side of disc 34 passes in proximity to pickup head 38 once per revolution of disc 34. The phase difference between the pulses produced by pickup heads 38 and 40 represents therefore the number of degrees that magnetic pickup head 38 is displaced from stationary pickup head 40 as measured in the direction of rotation of disc 34.

The count pulses for operation of counter 21 are generated in pickup head 42 which is mounted adjacent the outer periphery of disc wheel 35. If it is desired to duplicate 256 different positions of the director shaft 1, then disc 35 would have 256 equally separated magnetic areas 37 on its outer periphera. Since discs 34 and 35 are coupled to the same rotatable shaft 33′ which in turn is rotated by a high speed motor, for each revolution of discs 34 and 35 one pulse is produced by pickup head 40.

Figure 7 discloses an alternative embodiment for producing the various pulses shown in Figures 2 and 4. The source of energy for producing the above mentioned pulses is a sine wave voltage source (not shown) which feeds lines 52—53.

The reference pulses used to actuate switch 20 in Fig. 5 are produced by means of a squaring circuit 54 which converts the sine wave input applied to lines 52 and 53 into a symmetrical square wave. Circuits for performing this function are so well known in the art that further discussion of the details of this circuit are unnecessary.

By means of a peaker or differentiating circuit 55, also well known in the art, pulses are produced at the leading and trailing edges of the square wave which alternate in polarity. By a conventional clipper circuit such as a diode rectifier or the like, which is shown as part of box 55 in Figure 7, either the positive or negative pulses are eliminated so that there are positive or negative going pulses at the output of circuit 55 which occur at the frequency of the original sine wave.

The count pulses for actuating binary counter 21 of Fig. 5 are produced by feeding the reference sine wave to any well known suitable frequency multiplier circuit 56 which multiplies the frequency by a factor equal to the number of director positions it is desired to duplicate in the case given the multiplication would be 256. Then by similar squaring, peaker, and clipper circuits 57 and 58 pulses are produced which have a pulse repetition rate equal to the frequency of the multiplied sine wave frequency.

The variable phase pulses which represent the position of director shaft 1 or 2 are produced by a synchro type transformer 59. The primary winding 44 is rotatable with the director or follower shafts 1 and 2 and is energized through sliding contacts or slip rings 60. The secondary of transformer 59 is a delta or star connected group of windings 45 connected respectively by resistors 46, 47 and 48 to a common point *a*. Resistors 46 and 47 should be of equal value. Resistance 48 must be about 30 percent of the value of resistance 46 or 47. A condenser 48 and resistance 60′ are connected across two of the arms of the transformer secondary. The capacitance reactance of condenser 48 should be equal to the value of resistance 60. If the primary winding 44 is gradually rotated through a single revolution, the voltage appearing between points $a$ and $b$ will be gradually displaced in phase through 360 degrees. Then by squaring, peaking, and clipping means 50 and 51, pulses are produced which are in phase with the variable phase sine wave of voltage found across points $a$ and $b$.

Figure 8 shows one type of switch and gate circuit which may be used for gate and switch circuit combinations 19—20, 26—30, and 26—31 in Figure 5.

The switch circuit there shown comprises a conventional two stability Eccles-Jordan type circuit wherein by means of a cross resistance feedback circuit either one tube 62 or the other tube is in a conductive condition. Such circuits are so common in the art that further discussion is considered unnecessary except to say that if tube 61 is normally in a conductive condition then tube 62 is in a non-conductive condition due to the voltage drop across the common cathode resistance and vice versa. When a positive control pulse is fed to the grid of tube 62, which in circuit 19—20 of Figure 5 would be the reference pulse from director reference pulse generator 18, then tube 62 would be triggered into a conductive condition, and tube 61 would then be in a non-conductive condition.

The gate tube 64 may be a tetrode, pentode, or other tube with at least two control grids. By means of a negative bias fed to control grid 65 of tube 64, plate current is normally cut off. When tube 61 becomes non-conducting, and the voltage at the plate of tube 61 becomes highly positive thereby, the bias voltage on grid 65 of gate tube 64 is decreased enabling signals fed to the other control grid 66 to appear in the plate circuit of the gate tube 64. The gate circuit is then said to be "open."

If then a positive pulse is fed to the grid of switch tube 61, which in circuits 19—20 of Figure 5 would be the pulse from director pulse phasing means 17, tube 61 will become conducting, its plate voltage will fall to a low positive value enabling the negative bias fed to the grid 65 of gate tube 64 to cut off plate current flow even though signals are fed to the grid 66 of the gate tube so that the gate is in the "closed" position. Tube 62 would then be in the non-conducting condition.

As previously stated, the switch and gate circuits just described are used also for circuit 26—30, and 26—31 in Figure 5 so that gate tubes 30 and 31 are opened and closed in the manner just described.

Switch circuit 20, as previously described, and switch circuit 26 in Figure 5 perform an additional function in causing a relatively narrow triggering pulse to be fed to other circuits. For example, when switch 26 is switched to position 1, which means that switch tube 61 in Figure 8 is either in a conducting or non-conducting condition, a short pulse is fed to sequencer 27 to start the sequencing operation. The voltage at the plate of tube 61 has a square waveform which comprises positive and negative going pulses which are relatively long in duration. A conventional differentiating or peaker circuit (not shown in Figure 8) similar to that used in conjunction with the embodiment of Figure 7 is coupled to the plate of switch tube 61 for example so that a short positive pulse will appear at the instant tube 61 becomes non-conducting. The short negative pulse occurring at the instant tube 61 becomes conducting may be eliminated by a diode clipper 63 as shown in Figure 5.

Differentiator circuit 68 in Figure 5 performs the same function as differentiator circuit 67.

Referring to Figure 9, two stages of a conventional straight binary counter circuit is there shown suitable for use as counter 14 or 21 in Figure 5. Each stage consists of a two stability type circuit such as just described in connection with the switch circuit shown in Figure 8. The pulses to be counted are fed to the common cathode connection of the first stage, and the coupling between succeeding stages is also to the common cathode connection through a clipping means such as diode 71. For every two pulses fed to the first stage of the counter there shown, a single pulse is fed to the common cathode connection of the second stage, etc.

Normally the reset pulse sets the stages so that either the left or right tubes of each stage (the left stage shown in Figure 9) are in a conducting condition. This represents zero for the binary code.

Referring to Figure 10 where the circuit details of the sequencing circuit 23 and gate circuit 22 in the sending end of the follow-up system are shown, each stage of the sequencer 23 comprises a conventional one-shot multivibrator circuit having a stable and an unstable state is shown. As shown in Figure 10, the one-shot multivibrator comprises two common cathode coupled vacuum tubes where the right tube is normally in a conductive condition due to the fact that the grid is returned through the B plus supply and the left tube is normally non-conductive due to the bias developed across the common cathode resistance. When a positive pulse is delivered to the control grid of the left tube of first stage 72, the left tube suddenly becomes conducting and the right tube of that stage becomes non-conducting due to the voltage feedback through condenser 76′ which is coupled between the plate of the left hand tube to the grid of the right hand tube. (The positive pulse just mentioned would be from differentiator 68 in Figure 5 and would occur when switch 20 is triggered to the "off" position.) After a period of time depending on the time constant of the charge path of condenser 76′, the charge on the condenser 76′ is sufficiently great to allow the right tube to begin conducting which in turn cuts off the left hand tube due to the cathode bias developed across the common cathode resistance. The right hand tube remains conducting until the next positive pulse is fed to the grid of the left hand tube.

The various one-shot multivibrators are interconnected so that the sudden voltage rise occurring when the left hand tube becomes suddenly non-conducting is fed to the grid of the tube succeeding which is normally non-conducting. This triggers the second stage into the series of events previously described in connection with first stage 72 so that successively the left hand tubes of the various stages 73—75 become conducting in response to a single pulse being fed to the grid of the left hand tube of the first stage 72.

As previously stated, the purpose of the sequencing and gate circuit shown in Figure 10 is to convert the binary code stored in the counter into a group of successive pulses which represent the binary code.

If the binary code is 10110010, the conductive condition of either the left or right hand tubes of the successive stages of the counter from the first stage to the last is respectively: conducting-non-conducting-conducting-conducting - non-conducting-non-conducting-conducting-non-conducting. For an eight stage counter of which Figure 9 is the first two stages, the reference tube is the right tube of each stage since the left hand tube is normally made conductive by the reset or zero pulse. So if 00000000 represented zero, for the straight binary code 10110010 just described, the right tube of the first stage 69 would be conducting (1), and the right hand tube of the second stage 70 would be non-conducting (0).

Referring now to waveform $e$ of Figure 4, the pulse cycle for the transmitted code above mentioned binary code is shown. Each code character is represented by a time interval A–B–C–D–E–F–G–H–. In order to make it unnecessary to have the switching rate of the sending and receiving sequencers 23 and 27 exactly equal, the time interval of each code character at the sending end is broken down into at least 3 sections. The code pulse is made substantially narrower in duration than any of the code intervals A–B–C– etc., and is made to occupy the center section of the code interval as determined by the sending sequencer 23. Then, even if the receiving sequencer is not exactly in synchronism with the sending sequencer, as long as the center time section is entirely within the receiving sequencers code interval, the code will be properly stored in the receiving register.

In the sequencer circuit 23 of which Figure 10 is a part, a separate one-shot multivibrator stage is provided for each time section *i-a-ab*, etc. When the sequencer initiating pulses are fed to the grid of the left tube of the first stage 72 of the sequencer, the time constant of the condenser charge circuit is such that the right hand tube will only be non-conducting for the interval "*i*" in waveform *c* of Figure 4. At the end of this interval, the right hand tube of second stage 73 becomes non-conducting for the center section interval "*a*," etc.

The voltage at the plate of the last mentioned tube is coupled to one of the control grids 80 of a gate tube 76 which grid is normally held sufficiently negative to cut off plate current flow. This voltage being highly positive for the interval "*a*," the gate tube 76 will pass current for that duration if the bias on the other control grids 78—79 are not of a "cut-off" value. One of the other control grids 78 of tube 76 is coupled to the plates of one of the switch tubes of switch stage 20 so that only during the positive going portion of the square wave which appears at the plate of the last mentioned switch tube will the bias on control grid 78 be such that it will not cut off current flow. This means that an unblocking voltage is fed to the gate tubes of Figure 10 when switch 20 is in the off position which is during the interval that the gate 19 is closed. This is necessary to prevent the sequencer 23 from developing a group of code pulses except when the count period of counter 21 has been completed which occurs when gate 19 is closed. Otherwise, a false code will be transmitted.

Control grid 79 of gate tube 76 is normally biased beyond cut-off value by means of a separate negative voltage supply as shown. The grid is also directly coupled through a resistance to the plate of the counter tube which in the zero code position is in a conductive state so that the low positive value of voltage existing at the plate of the counter tube at that time is not sufficient to raise the voltage of grid 79 above cut-off value. For the counter shown in Figure 9, grid 79 would be coupled to the plate of the left tube in first counter stage 69. Thus only when the right counter tube of stage 69 is in a conductive state, and switch 20 is on the off condition, will the voltage pulse from the sequencer stage 73 appear at the plate of gate tube 76.

When the right tube of second stage 73 returns to its conductive state then the right tube of the next sequencer stage 74 becomes non-conductive. This stage supplies the interval "*ab*" during which a code pulse is not to be transmitted. Stage 74 is thus only a time delay means. Then during the center section interval "*b*" the bias grid 81 of the next gate tube 77 is raised above cut-off value by the voltage on the plate of the right tube of sequencer stage 75 so that a pulse of duration "*b*" will appear in the plate circuit of gate tube 77 if the right tube of second counter stage 70 is in the mark (1) or conductive state. For the code example previously given, since this is a space (0) code character, no pulse will appear since the right tube of the counter stage associated therewith will be non-conductive. It should now be apparent that the subsequent stages of the sequencer and gate circuits will operate in the manner just described in connection with the stages shown in Figure 10 to transmit a group of pulses which represents the particular binary code stored in counter 21.

Figure 11 shows the circuits at the receiving end which convert the sequence of pulses representing the binary code transmitted back into a binary code which is stored in the register 29.

Gate circuit 28 includes a plurality of gate circuits equal in number to the number of code characters in the code used. Figure 11 shows only two out of the eight gates needed for the 8 place binary code previously described. The output of the gate circuits are respectively coupled to one of the stages in the register 29. Each register stage 90, 91, etc. comprises an Eccles-Jordan two stability type circuit such as was described in connection with the counter circuit of Figure 9. By means of a reset pulse which occurs when switch 26 is placed in position 2 (see Figure 5) by the control pulse which precedes the code pulses, the left hand tubes in each stage of the register 29 are normally in a conducting condition representing zero code position The incoming code pulses are fed simultaneously to all of the signal control grids 84, 89, etc. of the gate circuits. If the bias on control grids 85, 89, etc. of the gate tubes are normally held below cut-off value, and the bias on the stages of the gate circuit 28 are successively raised to a value permitting plate current flow for periods which fall within the center sections of code intervals A–B– etc., then the code will be properly stored in the register 29.

Accordingly, the sequencer 27 comprises a number of stages 92, 93, etc. equal in number to the number of code characters in the binary code. Each stage is identical to the one-shot multivibrator stages of the sequencer 23 in operation except that each stage is in the unstable state for a period equal approximately to the code intervals A–B– etc. The control pulse from the output of clipper diode 63 in Figure 5 which initiates the sequencing cycle occurs at the beginning of the code cycle since switch 26 of Figure 5 is then triggered by the control pulse precedes the code pulses as previously explained. As long as a portion of the nonstable state of the sequencing stages occurs during the center section time intervals *a-b-c-* etc. of the associated pulse interval, then, as previously explained, the code will be properly stored. The point warrants repeating because it emphasizes the fact that the switching rate of the sequencers 23 and 27 could be a great deal different and still properly cause registration of the transmitted code. Without this feature, a follow-up system utilizing a radio or like communication link would be far less satisfactory.

In Figure 12 is shown the circuit details of a novel coincidence circuit 13. As previously mentioned, this circuit delivers a pulse when there is coincidence between the code stored in register 29 and the code indicated at any instant by counter 14.

Basically the coincidence circuit comprises a plurality of gate tubes 96, 100, 103, etc. equal in number to the number of counter and register stages. The plate current of these gate tubes are normally cut off by means of a positive bias voltage applied to the cathodes 98, 102, 105, etc. Read pulses are fed from delay circuit 32, which pulses originated in the pulse count generator 15 as was previously explained. The plates of all of the gate tubes are coupled to one of the control grids 108 of a multigrid gate tube 106 so that upon conduction of any one of the gate tubes 96, 100, etc., a negative pulse is fed to grid 108 cutting off plate current of gate tube 106. The read pulses are also fed to the signal control grid 108′ of gate tube 106 so that a pulse appears at the plate 107 only when all the triodes remain cutoff. The gate tubes 96, 100, 103, etc. are all non-conductive only when the associated register and counter stage indicate the same binary code character. The details of the circuit which controls the conduction or non-conduction of the gate tubes 96, 100, etc. is shown in Figure 12 applied only to one stage of the counter and register circuit, it being understood that there are seven other similar circuits associated with the other register and counter circuits.

This circuit comprises a group of four resistors 109–112 of equal value and two non-linear impedance elements 94—95 which have a higher resistance for current flow in one direction than in the other such as is characteristic of selenium rectifiers and the like.

One pair of resistances 109—110 are coupled between the plates of the left or right hand tube of the corresponding stage of the counter and register circuit, and the other resistances 111—112 are coupled between the other pair of plates of the corresponding counter and register stage. If the two rectifier devices 94 and 95 are coupled across the junction points of the resistance pairs just described so that they are in opposed relation (i.e. if current was flowing from left to right, from points *a* to *c* in Figure 12, one rectifier will be in the highly conductive state while the other will be in a low conductive state) the following results will occur if the arrows shown in the drawings represent the direction of highest conductivity using conventional current flow: If the left or right hand tubes of the counter and register stages are in a similar state of conduction (i.e. there is coincidence), the voltage at the junction point *b* of the rectifiers 94, 95 will be at a relatively low positive value, and if the left or right hand tubes are in a different state of conduction then the voltage at point *b* will be at a relatively high positive value. If tube 96 is rendered conductive only by the high positive voltage coupled directly to its control grid 97 from junction point *b*, then as long as there is a state of non-coincidence between the counter and register circuits, the read signals will appear at the plate of tube 96 which will cutoff plate conduction of gate tube 106 thus preventing a pulse from appearing at the output of gate tube 106.

If the rectifiers 94 and 95 were reversed in polarity from that shown in Figure 12, then coincidence would result in a higher positive voltage being fed to the gate tube 96 which would not operate properly for the circuit connections there shown since then gate tube 106 would deliver a pulse whenever there was no coincidence.

Figure 13 discloses the circuit details of the phase detector circuit 6 shown in Figures 1, 3, and 5. As is apparent from the previous explanatory matter, the function of the circuit is to provide a direct current control voltage proportional to the phase difference of the pulses fed thereto. Due to the nature of the circuit, zero output voltage occurs when the input pulses are 180 degrees out of phase with each other. Any change of phase relation from this position will result in a net positive or negative voltage depending on the direction of the phase change. The net result is that the director and follower shaft are really in one sense driven to a condition of 180 degrees out of phase. This of course does not prevent the system from operating as a follow-up system or a shaft position indicator. Should a pointer and scale be associated with the follower shaft, one need only calibrate the scale taking into consideration the 180 degrees out of phase relation between the director and follower shaft.

The voltage waveform of Figure 14 will aid in the explanation of the phase detector circuit which comprises an Eccles-Jordan two stability type circuit as previously described in connection with the counter and switch circuits, and an associated circuit including two diodes 111—112 which together with resistance and condenser networks 117, 118, 119 and 120 give a direct current output voltage across terminals 121 and 124 which is proportional in polarity and magnitude to the direction and magnitude of the phase difference between the pulses fed respectively to the control grids of the Eccles-Jordan circuit 110 from the coincidence circuit gate 30 and the follower reference generator gate 31.

If it is assumed that the left hand tube 121 of circuit 110 is conducting, and the pulses from the coincidence circuit gate 30 are then fed to the grid of left tube 121, and the pulses from the follower generator gate 31 are fed to the grid of the right tube 122 in the time sequence shown in Figures 14*a* and *b*, then Figure 14*c* shows the voltage waveform at the plate of left tube 121 which consists of a square wave having equal duration positive and negative going portions. This voltage is applied to a circuit including two paths, one path of which being conductive at any one time due to the fact that diodes 111—112 are connected in opposed relation with the plate 113 of diode 111 coupled to cathode 115 of diode 112. One path can be traced from the plate 113 to cathode 114 of diode 111 and then through the parallel circuit formed by condenser 119, and resistance 117 and condenser 120. This path is conductive during the positive going portion of the square wave shown in Figure 14*c*.

The other path can be traced from cathode 115 of diode 112 to the plate 116 thereof and then through the parallel path consisting of condenser 120 in parallel with resistance 117 and condenser 119.

The paths are symmetrical in the sense that resistances 128 and 129 which are connected between the ungrounded terminal of resistance 123 and the respective diodes 111—112 are of equal value as are condensers 119 and 121.

Due to the fact that the diodes 111, 112 allow substantial current flow in only one direction the voltage applied to the respective condensers 119 and 120 during heavy conduction is respectively the positive and negative going portions of the square wave of voltage developed across resistance 123 as shown in Figure 14*c*. If resistance 117 is made substantially larger than resistance 128 and 129 which are respectively in series with condensers 120 and 119 so that the charge path time constant is substantially less than the discharge path time constant (the discharge path consists of condensers 119, 120 and resistance 117) then the average value of the voltage across condensers 119 and 120 will be proportional respectively to the amplitude of the positive and negative portions (p and n) shown in Figure 14*c*. The movable contact of potentiometer 117 is placed in the mid-resistance point of potentiometer 117. Then the voltage between terminals 121 and 124 (between the mid point of potentiometer 117 and ground) can be shown to be given by the formula:

$$E\text{ (average value)}=\frac{E_{119}}{2}-\frac{E_{120}}{2}$$

where $E_{119}$ and $E_{120}$ are respectively the average positive value and the average negative value of the voltage across respective condensers 119 and 120. For the square wave shown in Figure 14*c* it should be apparent that E is zero.

With the respective phases of the pulses fed to switch circuit 110 of Figure 12 that shown in Figures 14*a* and 14*b*, condenser 119 will charge to an average positive value greater than the average negative value (see Figure 14*e* which shows the voltage across resistance 123) which will appear across condenser 120 so that there will be a net positive voltage across terminals 121 and 124 which will cause motor 8 to rotate in one given direction.

With the respective phases of the pulses fed to switch circuit 110 shown in Figures 14*a* and 14*f*, the voltage across resistance 123 will be that shown by Figure 14*g* which indicates that the average value of the positive voltage across condenser 119 will be less than the average negative voltage across condenser 120 so that a net negative voltage will appear across terminals 121 and 124.

Obtaining greater accuracy of the follow-up system could be more easily facilitated by adding a vernier shaft 1' shown in Figure 15*a* which is coupled to the main shaft 1 by a step-up gear arrangement. The present invention is then applied by transmitting shaft position information of two shafts rather than merely 1. Substantially the same circuits as shown in Figure 5 would be used with a few additional circuits. Thus the output pulses of the separate director shaft position generators would be fed to separate gate circuits 126 and 126' which are similar to the individual stages of gate circuit 22 as shown in Figure 10. A two position switch means 127 similar to that disclosed in Figure 8 is used to alternately render gates 126 and 126' operative to the control voltage from switch 20 coupled thereto so that only position information of one director shaft will be transmitted any one time. That is to say, switch 20 will control gates 126 and 126' in the same manner in which switch 20 controlled gate 19 in the embodiment of Figure 5 except that switch 127 controls the gate, 126 or 126', which will be opened by switch 20. By means of adding additional stages *a-b* to the sending and receiving gate and sequencer circuits 22, 23 and 27 and 28 and also additional register stages to register 29, two additional code positions are added to the binary code intervals A–H which will indicate which director shaft position the binary code information represents so that the pulses from the corresponding follower shaft position generator will be fed to the phase detector.

Depending on which of the added register stages is in the mark position, a gate control voltage will be fed to the corresponding gate tube 128 or 128' which will allow the proper follower position generator pulses to be fed to gate circuit 31 and then to the phase detector.

It should be understood that many of the specific details of the circuits shown and described are exemplary and many modifications may be made without deviating from the scope of the present invention.

The invention described herein may be manufactured and used by or for the Government of the United States of America for governmental purposes without the payment of any royalties thereon or therefor.

What is claimed is:

1. A follow up system comprising the combination of a moveable director means, a source of reference pulses, means responsive to the position of said director means for generating pulses at a given pulse repetition rate having a phase with respect to the phase of said reference pulses proportional to the position of said director means, a moveable follower means, means responsive to the position of said follower means for generating pulses at said given pulse repetition rate having a phase with respect to the phase of said reference pulses proportional to the position of said follower shaft, means responsive to the phase difference of the pulses produced by said pulse generating means associated with said director and follower means for moving said follower means into a position corresponding to that of said director means.

2. A telemetering system comprising the combination of means for generating a different coded group of pulses for each value of a given variable which is to be indicated at a remote location, means for transmitting said coded group of pulses to said remote location, means for storing said coded group of pulses at said remote location, an indicating means at said remote location, means for generating a different coded group of pulses corresponding to said first mentioned coded group of pulses for each position of said indicating means, means for changing the position of said indicating means whenever the second mentioned coded group of pulses indicate that said last named means is not indicating the value of said given variable.

3. A telemetering system comprising the combination of a means for generating information of the value of a given variable in the form of a given binary code, means for transmitting said binary code to a remote location in the form of pulses having a sequence and position corresponding to said binary code, receiving means responsive to the sequence of said pulses for storing said received binary code, moveable indicating means at said remote location, means coupled to said indicating means for generating a binary coded group of pulses corresponding to said given binary code representing each position of said indicating means, means for changing the position of said indicating means whenever said respective binary codes indicate that said indicating means is not indicating the value of said given variable.

4. A telemetering system comprising the combination of a means for generating information of the value of a given variable in the form of a given code, means for transmitting said code to a remote location in the form of pulses having a sequence and position corresponding to said code, receiving means responsive to the sequence of said pulses for storing said received code, moveable indicating means at said remote location, means coupled to said indicating means for generating code corresponding to said given code representing each position of said indicating means, means for changing the position of said indicating means whenever said respective codes indicate that said indicating means is not indicating the value of said given variable.

5. A telemetering system comprising the combination of a means for generating information of the value of a given variable in the form of a given code, means for transmitting said code to a remote location in the form of pulses having a sequence and position corresponding to said code, receiving means responsive to the sequence of said pulses for storing said received code, a moveable indicating means, a source of reference pulses, means coupled to said indicating means for generating pulses at a given pulse repetition rate whose phase with respect to the phase of said reference pulses is proportional to the position of said indicating means, means associated with said receiving means for generating pulses at said given pulse repetition whose phase with respect to the phase of said reference pulses varies with the particular code characters stored in said receiving means, means responsive to the phase difference of the pulses produced by both of said last named pulse generating means for moving said indicating means to a position indicating the value of said given variable.

6. A telemetering system comprising the combination of a means for generating information of the value of a given variable in the form of a given code, means for transmitting said code to a remote location in the form of pulses having a sequence and position corresponding to said code, receiving means responsive to the sequence of said pulses for storing said received code, a moveable indicating means, a source of reference pulses, means coupled to said indicating means for generating pulses at a given pulse repetition rate whose phase with respect to the phase of said reference pulses is proportional to the position of said indicating means, means associated with said receiving means for generating pulses at said given pulse repetition whose phase with respect to the phase of said reference pulses varies with the particular code characters stored in said receiving means, phase detecting means coupled to both of said last named pulse generating means for developing a control voltage whose magnitude is proportional to the phase difference of the pulses of said respective generating means, means responsive to said control voltage for moving said indicating means.

7. A follow up system comprising the combination of a moveable director means, means coupled to said director means for transmitting information of the position of said director means to a remote location in the form of a given code, receiving means for restoring said transmitted code, a moveable follower means, a source of reference pulses, means coupled to said follower means for generating a voltage at a given frequency whose phase with respect to the phase of said reference pulses is proportional to the position of said follower means, means associated with said receiving means for generating a voltage at said given frequency whose phase with respect to the phase of said reference pulses varies with the code stored in said receiving means, means responsive to the phase difference of the voltages generated by said two last named generating means for moving said follower means to a position corresponding with that of said director means.

8. A telemetering system comprising the combination of a means for generating information of the value of a given variable in the form of a given code, means for transmitting said code to a remote location in the form of pulses having a sequence and position corresponding to said code, receiving means responsive to the sequence of said pulses for storing said received code, a moveable indicating means, a source of reference pulses, means coupled to said indicating means for generating a voltage at a given frequency whose phase with respect to the phase of said reference pulses is proportional to the position of said indicating means, means associated with said receiving means for generating a voltage at said given frequency whose phase with respect to the phase of said reference pulses varies with the particular code characters stored in said receiving means, means responsive to the phase difference of the voltage produced by said last two named voltage generating means for moving said indicating means to a position indicating the value of said variable.

9. A telemetering system comprising the combination of a means for generating information of the value of a given variable in the form of a given binary code having X digits, means for transmitting said binary code to a remote location in the form of pulses whose existence or non-existence in each of X successive time intervals indicates the particular binary code character transmitted, means for receiving said coded pulse groups, a group of X registering means coupled to said receiving means, sequencing means coupled to said register means operative from the time the first digit character is to be received to successively render each of said group of X registers operative to register the presence of any pulses occurring within the time interval allotted to a particular digit, a source of reference pulses at a given pulse repretition rate, a moveable indicating means, means coupled to said indicating means for generating pulses at said given pulse repretition rate whose phase relative to said reference pulses varies with the position of said indicating means, an X stage binary counter, a pulse count generating means having a pulse repetition rate equal to a multiple of the pulse repetition rate of said source of reference pulses coupled to said binary counter, means coupling said reference pulses to said binary counter for periodically setting same to zero code position in isochronism therewith, coincidence circuit means for comparing the binary code stored in said register means with the binary code indicated in said counter and operative to generate a pulse in its output whenever said compared binary codes coincide, pulse phase responsive means operative to move said indicating means whenever the phase relation of the pulses fed thereto differ from a given phase relation, means coupling the pulses output of said coincidence circuit means and the pulse generating means coupled to said indicating means to the phase responsive means whereby said indicating means is moved to a position which will give a true indication of the value of said given variable.

10. A telemetering system comprising the combination of a means for generating information of the value of a given variable in the form of a binary code having X digits representing P difference values of said given variable, means for transmitting said binary code to a remote location in the form of pulses which may occupy any one of X time intervals wherein the pulses may have either of two possible characteristics which indicate the particular binary code character occupying that interval, means for receiving said code pulses, a group of X registering means coupled to said receiving means, sequencing means coupled to said register means operative from the time the first digit character is to be received to successively render each of said group of X registers operative to register the presence of a given pulse type occurring within the time interval allotted to a particular digit, a source of reference pulses at a given pulse repetition rate, a moveable indicating means, means coupled to said indicating means for generating pulses at said given pulse repetition rate whose phase relative to said reference pulse varies with the position of said indicating means, an X stage binary counter, a pulse count generating means having a pulse repetition rate equal to P times that of said source of reference pulses coupled to said binary counter, means coupling said reference pulses to said binary counter for periodically setting same to zero code position in isochronism therewith, coincidence circuit means for comparing the binary code stored in said register means with the binary code indicated in said counter and operative to generate a pulse in its output whenever said compared binary codes coincide, pulse phase responsive means operative to move said indicating means whenever the phase relation of the pulses fed thereto differ from a given phase relation, means coupling the pulses output of said coincidence circuit means and of the pulse generating means coupled to said indicating means to the phase responsive means whereby said indicating means is moved to a position which will give a true indication of the value of said given variable.

11. A telemetering system comprising means for generating information of the value of a given variable in the form of a binary code having X digits representing P different values of said variable, means for transmitting said code to a remote location, means for receiving and storing information of said transmitted binary code at said remote location, a source of reference pulses at a given pulse repetition rate, a moveable indicating means, means coupled to said indicating means for generating pulses at said given pulse repetition rate whose phase relative to said reference pulses varies with the position of said indicating means, an X stage binary counter, a pulse count generating means having a pulse repetition rate equal to P times that of said source of reference pulses coupled to said binary counter, means coupling said reference pulses to said binary counter for periodically setting same to zero code position in isochronism therewith, coincidence circuit means for comparing the binary code stored in said storing means with the binary code indicated in said counter and operative to generate a pulse in its output whenever said compared binary codes coincide, pulse phase responsive means operative to move said indicating means whenever the phase relation of the pulses fed thereto differ from a given phase relation, means coupling to the phase responsive means the pulses output of said coincidence circuit means and pulse generating means coupled to said indicating means whereby said indicating means is moved to a position which will give a true indication of the value of said given variable.

12. A telemetering system comprising means for generating information of the value of a given variable in the form of a binary code having X digits representing P different values of said variable, means for transmitting said code to a remote location, means for receiving and storing information of said transmitted code at said remote location, a source of reference pulses, first means synchronized by said source of reference pulses for periodically generating a changing code indication representing the changing code which would be transmitted if said given variable were gradually varied from one extreme to the other within the period between the pulses generated by said source of reference pulses, a moveable indicating means, means coupled to said indicating means for generating pulses at the pulse repetition rate of said reference pulses whose phase relative to said reference pulses varies with the position of said indicating means, coincidence circuit means for comparing the code stored in said storing means with that of said first means operative to generate a pulse whenever the compared codes coincide, pulse phase responsive means operative to move said indicating means whenever the phase relation of the pulses fed thereto differ from a given phase relation, means coupling to the phase responsive means the pulses output of said coincidence circuit means and pulse generating means coupled to said indicating means whereby said indicating means is moved to a position which will give a true indication of the value of said given variable.

13. A circuit for providing a group of pulses at a given repetition rate having a phase dependent on a given binary code comprising a source of reference pulses of fixed phase having said given pulse repetition rate, an X stage binary code register having a given count registered therein representing a particular code group of an X digit binary code, a binary counter hav- X stages, a pulse count generating means having a pulse repetition rate which is a multiple of said given pulse repetition rate coupled to the input of said bindary counter, means coupling said reference pulses to said binary counter for periodically setting same to zero count position in isochronism therewith, coincidence circuit means for comparing the binary code stored in said binary code register with the binary code stored at any given instant in said binary counter and operative to generate a pulse in its output whenever said compared codes coincide.

14. A circuit for providing a group of pulses at a given repetition rate having a phase dependent on a given X digit binary code combination comprising first means for generating a particular binary code combination in the form of pulses which may occupy any one of X time intervals wherein the pulses may have either of two possible characteristics which indicate the particular binary code character occupying that interval, a group of X registering means coupled to the output of said first means, sequencing means coupled to said X registering means operative from the instant the first digit character occurs to successively render each of said X registers operative to register the presence of a given pulse type occurring within the time interval allotted to a particular digit, a source of reference pulses at fixed phase having said given pulse repetition rate, a binary counter having X stages, a pulse count generating means having a pulse repetition rate which is a multiple of said given pulse repetition rate coupled to the input of said binary counter, means coupling said reference pulses to said binary counter for periodically setting same to zero count position in isochronism therewith, coincidence circuit means for comparing the binary code stored in said X registering means with the binary code stored at any given instant in said binary counter and operative to generate a pulse in the output whenever said compared binary codes coincide.

References Cited in the file of this patent

UNITED STATES PATENTS

| | | |
|---|---|---|
| 2,397,604 | Hartley et al. | Apr. 2, 1946 |
| 2,537,427 | Seid et al. | Jan. 9, 1951 |
| 2,564,403 | May | Aug. 14, 1951 |
| 2,567,862 | Van Voorhis | Sept. 11, 1951 |